United States Patent [19]

Yokoyama

[11] Patent Number: 5,173,548

[45] Date of Patent: Dec. 22, 1992

[54] EPOXY-MODIFIED HYDROCARBON RESINS

[75] Inventor: Naoki Yokoyama, Fukuoka, Japan

[73] Assignee: Nippon Steel Chemical Co., Ltd., Tokyo, Japan

[21] Appl. No.: 399,546

[22] PCT Filed: Dec. 12, 1987

[86] PCT No.: PCT/JP87/00974

§ 371 Date: Aug. 7, 1989

§ 102(e) Date: Aug. 7, 1989

[87] PCT Pub. No.: WO89/05321

PCT Pub. Date: Jun. 15, 1989

[51] Int. Cl.⁵ .................. C08G 59/04; C08L 63/00
[52] U.S. Cl. ............................ 525/534; 523/414; 525/108; 525/119; 525/454; 525/523; 525/533; 527/503; 528/482; 528/485; 528/487
[58] Field of Search .......... 525/534, 523; 528/95, 528/488, 482, 485, 487; 527/503

[56] References Cited

U.S. PATENT DOCUMENTS

| | | | |
|---|---|---|---|
| 2,865,887 | 12/1958 | MacKenzie et al. | 260/29.6 |
| 3,644,537 | 2/1972 | Dannels et al. | 525/534 |
| 4,471,106 | 9/1984 | Luecke et al. | 525/534 |
| 4,491,667 | 1/1985 | Saito et al. | 549/302 |
| 5,008,350 | 4/1991 | Saito et al. | 525/507 |

FOREIGN PATENT DOCUMENTS

| | | |
|---|---|---|
| 32-1138 | 2/1957 | Japan . |
| 59-52656 | 12/1984 | Japan . |
| 63-99218 | 4/1988 | Japan . |

*Primary Examiner*—Robert E. Sellers
*Attorney, Agent, or Firm*—Armstrong & Kubovcik

[57] ABSTRACT

Epoxy-modified hydrocarbon resins of this invention are prepared by copolymerizing hydrocarbon olefins mainly consisting of aromatic olefins such as indene, styrene, and coumarone with phenols and epoxidizing the copolymers with epichlorohydrin and are useful as modifiers and base polymers for coatings, adhesives, rubbers, and IC encapsulants and also as raw materials for the compatibilizers for incompatible polymer systems because of their capability of undergoing crosslinking or grafting reactions with polymers having functional groups or chemical compositions reactive with the epoxy groups.

5 Claims, 2 Drawing Sheets

EPOXY-MODIFIED HYDROCARBON RESINS

FIELD OF THE INVENTION

This invention relates to epoxy-modified hydrocarbon resins which are useful as modifiers and base polymers for coatings, adhesives, rubbers, integrated circuit (IC) encapsulants, and the like and also useful as raw materials for compatibilizing agents for incompatible polymers.

BACKGROUND OF THE INVENTION

Hydrocarbon resins and hydrocarbon elastomers obtained from unsaturated aromatic hydrocarbons, namely from aromatic olefins or from fractions containing such aromatic olefins, have been used as modifiers for coatings, adhesives, rubbers, and IC encapsulants as they are capable of plasticizing base polymers, relaxing the internal stress generated during the curing of base polymers, increasing the initial tack and adhesive strength of base polymers, and improving the water resistance of base polymers. The modifying effects produced by such hydrocarbon resins and hydrocarbon elastomers, however, have not been too satisfactory. In particular, they are not applicable to strongly polar base polymers because of their poor compatibility. Moreover, they exhibit such low reactivity with base polymers as to reduce the mechanical strength, cohesion, adhesion, and rust-preventing capability of the base polymers after the curing of the coatings or adhesives or they migrate to the surface of the coatings or into the adhesive interface with the resultant discoloration and stickiness.

A few concrete examples are cited. In the preparation of corrosion-resistant lacquer compositions from polymers of acrylic acid or methacrylic acid or from copolymers of these acids with styrene, there have not been suitable substances which are reactive with these base polymers, function as plasticizers with good compatibility, and provide adhesion and rust prevention.

Two-pack epoxy or polyurethane coatings, adhesives, sealants, and caulking materials generate a large internal stress in the curing reaction and this disadvantageously reduces the adhesion, water resistance, and corrosion prevention of the cured coats or adhesive layers.

In the rubber industry, there has been a desire to apply a compound of natural rubber and a vinyl chloride resin to shoe soles and the like as a novel rubber having concurrently the elasticity of the former and the weathering resistance of the latter though the two constitute an incompatible system. Consequently, it has become necessary to find compatibilizers for such incompatible polymers. Known hydrocarbon resins, however tried, would not work as compatibilizers or tackifiers on account of their being compatible solely with the natural rubber phase.

In the automotive paints, there has arisen a need for improving the anti-corrosion performance of cationic electrodeposition coatings to be used for undercoats. The conventional hydrocarbon resins, however, are inert to cationic electrodeposition and are not applicable as anti-corrosion agents.

In the area of epoxy resin-based IC encapsulants, a large internal stress is generated during the curing of the encapsulants and this has caused a number of problems such as decreases in encapsulant-lead adhesion, water resistance, and reliabilty of the IC performance and formation of cracks. Hydrocarbon elastomers, for instance polybutene, have been applied to reduce the internal stress, but their poor compatibility with epoxy resins has produced such defects as staining of the molds during the molding operation, haze and turbidity on the surface of the molded articles, and bleeding to the surface.

Typical curing agents for epoxy resins are acid anhydrides, aromatic amines, and phenolic novolak resins. In particular, those epoxy resin molding materials which contain phenolic novolak curing agents have been used widely as encapsulants for IC and other semiconductor devices on account of their ease of molding, excellent moisture resistance, nontoxicity, and low cost.

A composition of epoxy resins and the resins obtained by polymerizing hydrocarbons such as styrene, indene, and alkylindenes and phenols in the presence of a Friedel-Crafts catalyst is disclosed in Japan Tokkyo Kokai Koho No. 59-52,656 (1984). The composition in question, however, is merely a mixture of individual resins and is not concerned with epoxidized hydrocarbon resins.

The present inventors have reviewed the prior art technology, conducted extensive studies, and completed this invention based on the finding that epoxy-modified hydrocarbon resins can be obtained by the copolymerization of hydrocarbon olefins and phenols in the presence of an acid catalyst followed by the reaction of the resulting copolymers with epichlorohydrin.

Accordingly, an object of this invention is to solve the problems in the conventional hydrocarbon resins and hydrocarbon elastomers.

Another object of this invention is to synthesize epoxy-modified hydrocarbon resins having the epoxy groups as reactive or polar functional group and offer such epoxy-modified hydrocarbon resins as modifiers or base polymers for coatings, adhesives, rubbers, and IC encapsulants.

Still another object of this invention is to provide epoxy-modified hydrocarbon resins which are useful as raw materials for the reactions with other substances having functional groups or chemical compositions reactive with the epoxy groups to furnish novel resins having simultaneously the functions inherent in the hydrocarbon resins and those in said other substances.

DISCLOSURE OF THE INVENTION

This invention relates to epoxy-modified hydrocarbon resins which are obtained by the condensation of epichlorohydrin with the copolymers of hydrocarbon olefins and phenols. The epoxy-modified hydrocarbon resins are prepared in two steps: hydrocarbon olefins are copolymerized with phenols in the presence of an acid catalyst to yield phenol-modified hydrocarbon resins in the first step and said phenol-modified hydrocarbon resins are allowed to react with epichlorohydrin in the presence of an alkali for the modification with epoxy groups in the second step.

The hydrocarbon olefins to be used in this invention are, for example, aromatic olefins such as indene, styrene, and coumarone and aliphatic olefins such as butene, pentene, butadiene, isoprene, and piperylene. It is desirable for such hydrocarbon olefins to consist mainly of aromatic olefins. The hydrocarbon olefins may be of one kind or a mixture of two or more kinds and, preferably, petroleum or coal tar fractions containing large quantities of aromatic olefins. A petroleum fraction boiling in the range of 140° to 280° C., a byproduct in the cracking operation, is preferable as it contains 35 to 65% by weight of aromatic olefins with 8 to 10 carbon atoms such as styrene, alkylstyrenes, indene, and alkylindenes. More preferable is a coal tar fraction boiling in the range of 130° to 280° C., preferably 130° to 200° C., and containing 40 to 70% by weight of aromatic olefins such as indene, coumarone, and styrene. A composition of such a desirable coal tar fraction is given below as an example.

| Benzene | 1.5% by weight |
|---|---|
| Toluene | 8.5 |
| Xylenes | 13.5 |
| Styrene | 12.5 |
| Naphthalene | 3.0 |
| Trimethylbenzenes | 10.5 |
| Coumarone | 5.5 |
| Dihydroindene | 5.5 |
| Indene | 34.5 |
| Others | 5.0 |

The phenols may be any compounds having phenolic hydroxyl groups, for example, phenol, alkylphenols such as cresol and xylenol, and vinyl-containing phenols such as vinylphenol and isopropenylphenol. Those phenols which contain the vinyl groups are polyfunctional.

The acid catalysts to be used in the first-step reaction are, for example, Broensted acids such as sulfuric acid, hydrochloric acid, nitric acid, and phosphoric acid, Lewis acids such as boron trifluoride and aluminum chloride or their complexes, and solid acids such as activated clay and strongly acidic ion-exchange resins. The reaction temperature should preferably be in the range of 50° to 100° C.

The ratio of the hydrocarbon olefins to the phenols is 1 mole of the former to 0.1 mole or more of the latter. Any phenol added in excess remains unchanged in the reaction and an addition in the range of 0.1 to 0.8 mole is preferable.

Upon completion of the first-step reaction, the catalyst and the unchanged reactants are removed to yield the phenol-modified hydrocarbon resins. It was normally observed that such modified resins were primarily dimers to octamers of the hydrocarbon olefins with one end linked to a phenol molecule.

Epichlorohydrin in the second step is used in excess of the phenolic hydroxyl groups in the first-step reaction products, preferably 6 times or more in mole. Any of prior art epoxidation processes is applicable to the reaction of epichlorohydrin with the phenol-modified hydrocarbon resins. A desirable process is to dissolve the phenol-modified hydrocarbon resins in an excess of epichlorohydrin and add in drops an aqueous solution of a strong alkali, preferably sodium hydroxide or potassium hydroxide. The reaction temperature is kept at 50° to 100° C., preferably 60° to 80° C. Moreover, it is preferable to conduct the reaction with attendant removal of the water from the reaction system. The reaction is carried out until 30 mole % or more, preferably 40 mole % or more, more preferably 50 mole % or more, of the phenolic hydroxyl groups is epoxidized.

Upon completion of the epoxidation reaction, the excess alkali remaining in the system is neutralized with a solid acid such as activated clay, acidic clay, an acidic ion-exchange resin, and solid phosphoric acid and the solid acid is removed from the system by solid-liquid separation together with the salts formed in the reaction. The turbidity of the resins due to the residual alkali is prevented in this manner.

The epoxy-modified hydrocarbon resins of this invention have the epoxy groups in their molecular structure and they can be crosslinked with substances having functional groups or chemical compositions reactive with the epoxy groups such as amines and carboxylic acids. This property is probably responsible for increasing the mechanical strength and cohesive force and reducing the bleeding of the hydrocarbon resins to the surface in the cured coatings and adhesives in the applications to coatings, adhesives, sealants, and caulking materials. It is also likely to be effective for relaxing the internal stress with reduced staining of the molds during the molding operation in the applications to IC encapsulants.

The epoxy-modified hydrocarbon resins, because of their polarity, show better compatibility with polar polymers such as polymers of acrylic acid, methacrylic acid, and their esters and polyurethanes than the conventional hydrocarbon resins. This improvement in compatibility will probably make the characteristic effects of hydrocarbon resins such as plasticization and water resistance a lot more pronounced and provide better adhesion, corrosion prevention, and water resistance in the fields of coatings, adhesives, and sealants.

The epoxy-modified hydrocarbon resins are also useful as plasticizers and fillers for general-purpose epoxy resins such as bisphenol A-based epoxy resins and serve as agents to relax the internal stress, improve the adhesion, and prevent corrosion in the coatings and adhesives based on epoxy resins.

The reaction of the epoxy-modified hydrocarbon resins with other substances containing functional groups or chemical compositions reactive with the epoxy groups will yield novel resins possessing functions of both the hydrocarbon resins and such other substances. For example, the reaction of the epoxy-modified hydrocarbon resins with secondary amines followed by the neutralization with acids will yield resins which exhibit corrosion-preventing and plasticizing effects due to the hydrocarbon resins on the one hand and water solubility and cationization due to the amine-acid groups on the other. Such novel resins are expected to serve as agents to produce excellent corrosion prevention and adhesion when applied to cationic electrodeposition paints.

Moreover, the reaction of the epoxy-modified hydrocarbon resins with polyamino resins will probably yield new resins possessing simultaneously compatibility of the hydrocarbon resin segments with natural rubber and that of the polyamino resin segments with vinyl chloride resins. The reaction products will then act as excellent compatibilizers and tackifiers for the incompatible natural rubber-vinyl chloride resin system and help to provide new compounds showing the elasticity inherent in the natural rubber and the weathering resistance characteristic of the vinyl chloride resins.

PREFERRED EMBODIMENTS OF THE PRACTICE OF THE INVENTION

This invention is explained in detail with reference to the accompanying examples.

EXAMPLE 1

First-step reaction: Into a 500-ml flask fitted with a stirrer, a reflux condenser, and a thermometer were introduced 40.0 g of indene, 16.2 g of phenol, and 60.0 g of xylene as solvent and the mixture was heated to 70° C. with stirring.

Boron trifluoride ethyl etherate [$BF_3O(C_2H_5)_2$] (1.0 ml) as catalyst was then added in drops while exercising care not to cause a rapid reaction, the large reaction heat generated in the initial phase of the reaction was removed by an ice water bath, and the polymerization reaction was allowed to proceed at 70°±2° C. for one hour after the generation of the reaction heat had subsided. Upon completion of the reaction, 1.2 g of slaked lime was added and the catalyst was decomposed at 70° C. for 15 minutes. Thereafter, the contents of the flask in slurry were filtered by suction to remove the decomposition products of the catalyst and the excess of the slaked lime. The filtrate was placed in a rotary evaporator and heated with a progressive increase in temperature to 220° C. and a progressive decrease in pressure to 5 torr to remove the xylene and yield a phenol-modified indene resin.

The phenol-modified indene resin thus obtained was reddish brown and transparent and showed a softening point of 80.0° C. and a hydroxyl equivalent of 442 g.

Figure 1:
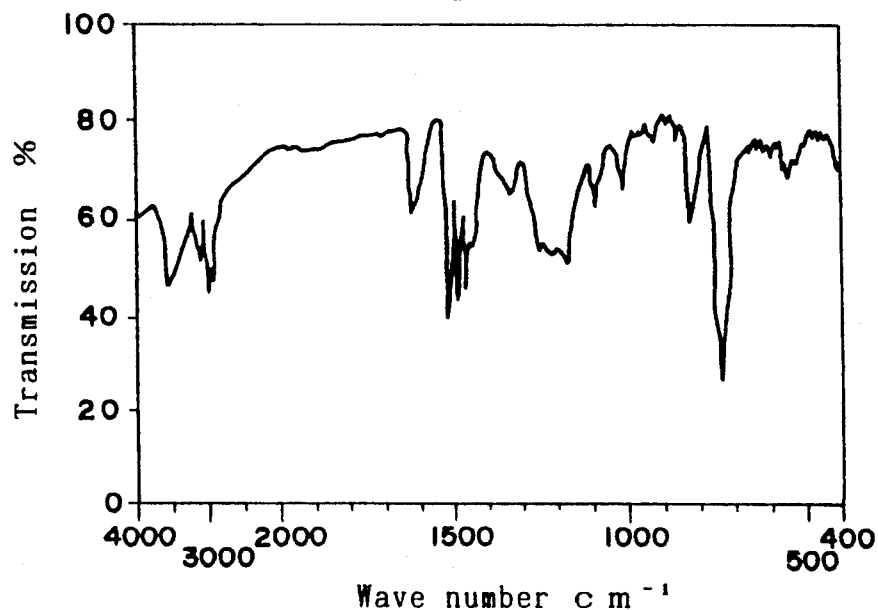
FIG. 1 shows the infrared spectrum of the first-step reaction product in Example 1.

The infrared spectrum of the first-step reaction product is shown in FIG. 1. The absorption band at 3550 $cm^{-1}$ is characteristic of the hydroxy group and indicates the copolymerization of indene and phenol.

Second-step reaction: Into a 250-ml flask fitted with a stirrer, a thermometer, and a reflux condenser were introduced 20.0 g of the phenol-modified indene resin synthesized in the first-step reaction and 45.3 g of epichlorohydrin and heated with stirring until a solution resulted. To this solution was added 5.8 g of a 40% by weight aqueous solution of sodium hydroxide and the mixture was heated at the boiling point (about 100° C.) for 2 hours. After the reaction was over, the water was removed from the system by simple distillation at ambient pressure. The remaining reaction mixture was filtered for rough separation of the sodium chloride and the sodium hydroxide. The filtrate was then concentrated by steam distillation to drive off the excess epichlorohydrin to yield a resin turbid with the residual sodium chloride and sodium hydroxide. The resin was dissolved in an equal amount of xylene, mixed with 6 g of activated clay, and stirred to neutralize the excess sodium hydroxide and the spent clay was filtered off. Finally, the solution was concentrated by steam distillation to yield an epoxy-modified indene resin.

The epoxy-modified indene resin thus obtained showed a softening point of 68.0° C. and an epoxy equivalent of 843 g and the degree of epoxidation was 59.7% by weight when calculated from the hydroxyl equivalent of the first-step reaction product and the epoxy equivalent of the second-step reaction product.

Figure 2:
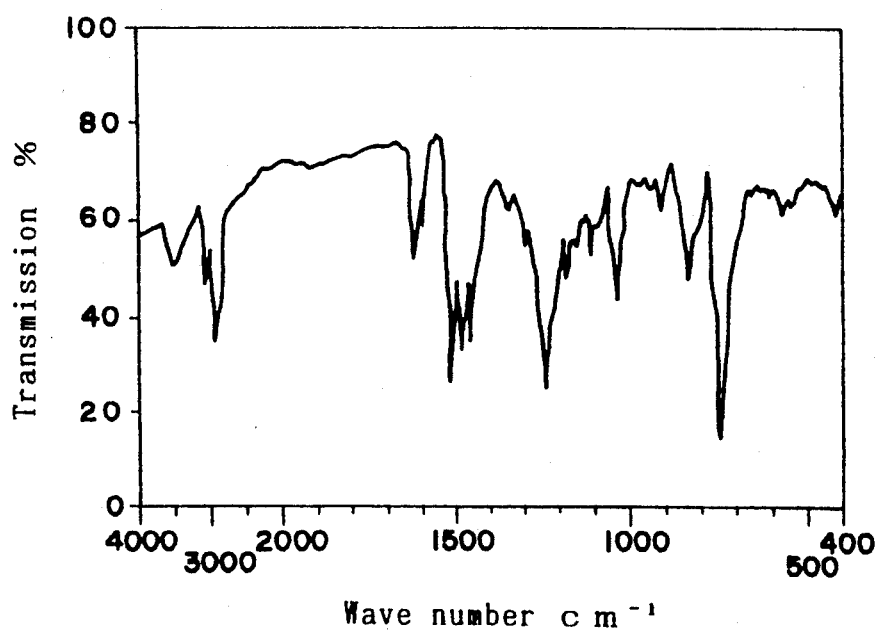
FIG. 2 shows the infrared spectrum of the second-step reaction product in Example 1.

The infrared spectrum of the second-step reaction product is shown in FIG. 2. The occurrence of epoxidation was proved by the absence in FIG. 1 and the presence in FIG. 2 of the absorption bands near 910 $cm^{-1}$ and 1240 $cm^{-1}$ characteristic of the epoxy groups and by the simultaneous weakening in intensity of the absorption band at 3550 $cm^{-1}$ characteristic of the hydroxyl group.

An epoxy-modified indene resin was prepared as in Example 1 with the exception that the excess caustic soda remaining after the epoxidation reaction was removed not by neutralizing with activated clay but by washing with water five times. The resin was slightly turbid and obtained in a 52% yield.

EXAMPLE 2

First-step reaction: Into a 2-l flask fitted with a stirrer, a reflux condenser, and a thermometer were introduced 1300 g of the feed oil which had been obtained by removing acids and bases from a coaltar light oil containing 12.7% of styrene, 3.5% of p-methylstyrene, 29.1% of indene, and 3.1% of coumarone (as percent area of the gas chromatogram) and boiling in the range of a first drop point of 135° C. to a dry point of 195° C. as hydrocarbon olefin and 325 g of phenol and heated with stirring to 70° C. Then, 14.3 ml of boron trifluoride ethyl etherate as catalyst was added in drops while exercising care not to cause an abrupt reaction, the large heat of reaction generated in the initial phase of the reaction was removed by an ice water bath, and the polymerization reaction was allowed to proceed at 70°±2° C. for 3 hours after the generation of heat had subsided. Upon completion of the reaction, 32.5 g of slaked lime was added and the catalyst was decomposed at 70° C. for 15 minutes. After the decomposition of the catalyst, the contents in slurry were filtered by suction to remove the decomposition products of the catalyst and the excess slaked lime. The polymer oil thus obtained was placed in a 2-l round-bottomed flask and steam-distilled by blowing heated steam in to evaporate off the solvent and yield a phenol-modified hydrocarbon resin. The steam distillation was terminated at the point where the temperature of the polymer oil reached 220° C.

The phenol-modified hydrocarbon resin thus obtained was reddish brown and transparent, was viscous at ambient temperature, and showed a hydroxyl equivalent of 355 g.

Figure 3:
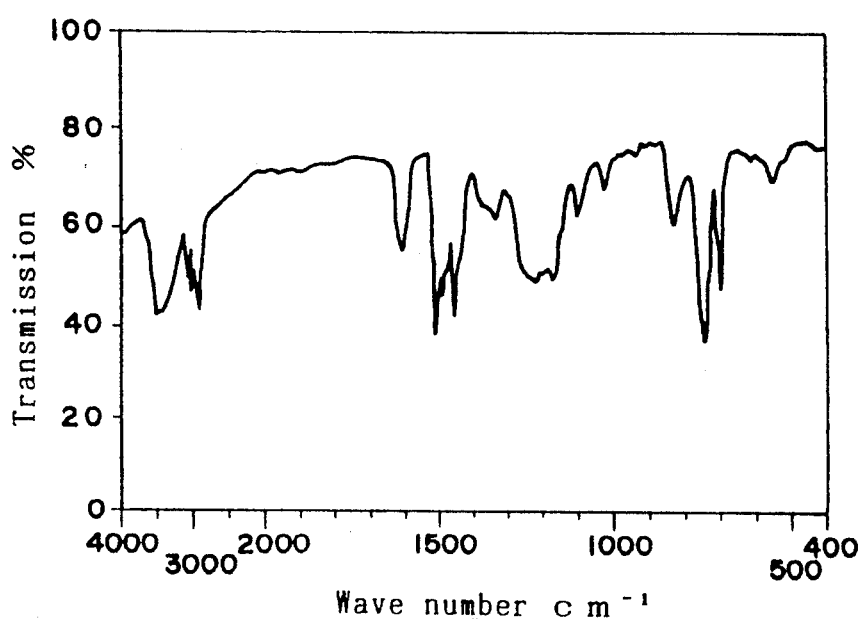
FIG. 3 shows the infrared spectrum of the first-step reaction product in Example 2.
Figure 4:
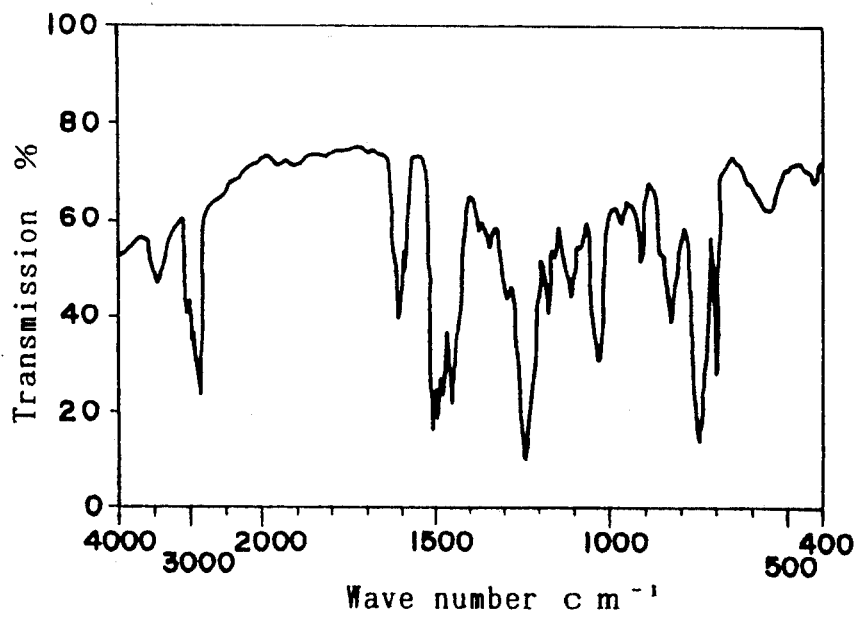
FIG. 4 shows the infrared spectrum of the second-step reaction product in Example 2.

The infrared spectrum of the first-step reaction product is shown in FIG. 3. The absorption band at 3550 $cm^{-1}$ is characteristic of the hydroxyl group as in FIG. 1.

Second-step reaction: Into a 2-l separable flask fitted with a stirrer, a refluxe condenser, and a thermometer were introduced 400 g of the phenol-modified hydrocarbon resin synthesized in the first step and 1,038 g of epichlorohydrin and the mixture was stirred to dissolve the resin in the epichlorohydrin. Then, 133 g of a 40% by weight aqueous solution of sodium hydroxide was introduced into the flask and the reaction was allowed to proceed at the boiling point (approximately 100° C.) for 4 hours. After the reaction was over, the mixture was worked up as in Example 1 to yield a yellow transparent epoxy-modified hydrocarbon resin. The amount of the activated clay used for the neutralization reaction was 144 g.

The epoxy-modified hydrocarbon resin showed an epoxy equivalent of 632 g and the degree of epoxidation was calculated to be 65.0% by weight from the hydroxyl equivalent of the first-step reaction product and the epoxy equivalent of the second-step reaction product.

The infrared spectrum of the second-step reaction product is shown in FIG. 2. The absorption bands characteristic of the epoxy groups are absent in FIG. 1 but are observed near 910 cm$^{-1}$ and 1,240 cm$^{-1}$ here while the absorption band characteristic of the hydroxyl group at 3,550 cm$^{-1}$ was weaker in intensity here than in FIG. 1. This finding proves the occurrence of epoxidation.

INDUSTRIAL APPLICABILITY

The epoxy-modified hydrocarbon resins of this invention possess reactive epoxy groups which are absent in the conventional hydrocarbon resins and they can be subjected to the crosslinking or grafting reactions with polymers containing functional groups or chemical compositions reactive with the epoxy groups such as polyamines. In applications to coatings and adhesives, they provide tack and corrosion prevention like the conventional hydrocarbon resins and additionally they increase the cohesive force and mechanical strength after curing. In the field of IC encapsulants, the epoxy-modified hydrocarbon resins are effective as internal plasticizers with reduced staining of the mold. Moreover, the resins formed by grafting the epoxy-modified hydrocarbon resins to other polymers by utilizing the reactivity of the epoxy groups have the hydrocarbon resin segments and the main chains differing in compatibility and they can act as compatibilizer or internal plasticizer of those polymers which are by nature incompatible with one another. When used as modifiers for epoxy resins, the epoxy-modified hydrocarbon resins function as internal plasticizers and contribute to improvement of the impact resistance without adversely affecting the water resistance and electrical properties. Moreover, the polarity of the epoxy groups in the resins makes them compatible with some of the substances which are known to be incompatible with the conventional hydrocarbon resins and may be useful for the modification of such substances.

What is claimed is:

1. An epoxy-modified hydrocarbon resin prepared by epoxidizing at least 30 mole % of phenolic hydroxyl groups of a phenol-modified hydrocarbon resin obtained by the copolymerization of a coaltar fraction containing 40 to 70% by weight of aromatic olefins which mainly consist of indene, styrene and coumarone and at least one phenol selected from the group consisting of phenol and alkyl phenols.

2. The epoxy-modified hydrocarbon resin of claim 1, wherein said coaltar fraction has a boiling point in the range of 130°–280° C.

3. The epoxy-modified hydrocarbon resin of claim 1, wherein said resin is prepared by epoxidizing at least 40 mole % of phenolic hydroxyl groups of a phenol-modified hydrocarbon resin comprising polymers of aromatic olefins with one end linked to one molecule of the phenol.

4. The epoxy-modified hydrocarbon resin of claim 3, wherein said phenol-modified hydrocarbon resin comprises at least one member of the group consisting of dimers to octamers of said aromatic olefins.

5. The epoxy-modified hydrocarbon resin of claim 1, wherein the epoxy-modified hydrocarbon resin is prepared by condensing one mole of phenolic hydroxyl groups in a phenol-modified hydrocarbon resin with at least 6 moles of epichlorohydrin and dehydrochlorinating and dehydrating at 50° to 100° C. in the presence of an aqueous alkaline solution, neutralizing thereafter the excess alkali with a solid acid, and finally removing the solid acid together with the salts formed in the reaction by solid-liquid separation.

* * * * *